United States Patent [19]
Hosoya

[11] Patent Number: 5,288,982
[45] Date of Patent: Feb. 22, 1994

[54] METHOD FOR CHANGING A FILE NAME OF A DIRECTORY IN A NON-REWRITABLE RECORD MEDIUM

[75] Inventor: Hideki Hosoya, Yokohama, Japan

[73] Assignee: Canon Kabushika Kaisha, Tokyo, Japan

[21] Appl. No.: 712,101

[22] Filed: Jun. 7, 1991

[30] Foreign Application Priority Data

Jun. 11, 1990 [JP] Japan .................................. 2-149819

[51] Int. Cl.⁵ .......................... G06K 7/10; G11B 27/28
[52] U.S. Cl. ..................................... 235/454; 369/30; 369/32; 369/58
[58] Field of Search ..................... 235/454; 369/58, 59, 369/30, 32

[56] References Cited

U.S. PATENT DOCUMENTS

| | | | |
|---|---|---|---|
| 4,682,318 | 7/1987 | Busby | 369/59 |
| 4,910,724 | 3/1990 | Sakagami et al. | 369/100 |
| 4,982,074 | 1/1991 | Ogasawara | 235/454 |

FOREIGN PATENT DOCUMENTS

| | | |
|---|---|---|
| 0165382 | 12/1985 | European Pat. Off. . |
| 0243186 | 10/1987 | European Pat. Off. . |
| 0260115 | 3/1988 | European Pat. Off. . |
| 0302119 | 2/1989 | European Pat. Off. . |
| 0355620 | 2/1990 | European Pat. Off. . |
| 258288 | 10/1989 | Japan . |
| 265074 | 10/1990 | Japan . |
| 297291 | 12/1990 | Japan . |

OTHER PUBLICATIONS

Patent Abstracts of Japan, Kokai No. 02-8943, vol. 14, No. 148, Mar. 1990.

Primary Examiner—John Shepperd
Attorney, Agent, or Firm—Fitzpatrick, Cella, Harper & Scinto

[57] ABSTRACT

A method for changing a file name of one of data on a record medium having a plurality of data and a plurality of directories for the data including file names of the data recorded thereon, includes the steps of recording on the record medium a first change directory including the file name of the one data and information indicating that the change directory is a directory for changing the file name; and recording on the record medium a second change directory including a new file name to be imparted to the one data.

23 Claims, 8 Drawing Sheets

FIG.5A

| | |
|---|---|
| 301 | DIRECTORY A (1) |
| 302 | DIRECTORY B (1) |
| 303 | DIRECTORY C (1) |
| 304 | DIRECTORY A (2) |
| 305 | DIRECTORY A (3) |
| 306 | DIRECTORY A (R) |
| 307 | DIRECTORY D (N) |

FIG.5B

| | |
|---|---|
| 301 | DIRECTORY A (1) |
| 302 | DIRECTORY B (1) |
| 303 | DIRECTORY C (1) |
| 304 | DIRECTORY A (2) |
| 305 | DIRECTORY A (3) |

FIG.5C

| | |
|---|---|
| 301 | DIRECTORY D (1) |
| 302 | DIRECTORY B (1) |
| 303 | DIRECTORY C (1) |
| 304 | DIRECTORY D (2) |
| 305 | DIRECTORY D (3) |

FIG. 7

| No. | FILE NAME | EXTENSION | ATTRIBUTE | LEADING TRACK NUMBER | LEADING SECTOR NUMBER | FILE SIZE | APPEND FLAG | DELETE BIT |
|---|---|---|---|---|---|---|---|---|
| 1 | ABC | | | 1 | 1 | 256 | 1 | 0 |
| 2 | DE | | | 2 | 1 | 128 | 1 | 0 |
| 3 | FGH | | | 2 | 2 | 32 | 1 | 0 |
| 4 | DE | | | 2 | 1 | 128 | 0 | 1 |
| ... | ... | | | ... | ... | ... | ... | ... |
| 20 | ABC | | | 100 | 1 | 128 | 2 | 0 |
| .. | .. | | | .. | .. | .. | .. | .. |
| 30 | ABC | | | 200 | 1 | 256 | 3 | 0 |
| 31 | ABC | | | | | | R | 0 |
| 32 | IJK | | | | | | N | 0 |
| .. | .. | | | .. | .. | .. | .. | .. |

FIG. 8

| No. | FILE NAME | EXTENSION | ATTRIBUTE | LEADING TRACK NUMBER | LEADING SECTOR NUMBER | FILE SIZE | AF | | | | DB |
|---|---|---|---|---|---|---|---|---|---|---|---|
| | | | | | | | AB | AF | CB | | |
| 1 | ABC | | | 1 | 1 | 256 | 0 | 1 | 0 | 0 | 0 |
| 2 | DE | | | 2 | 1 | 128 | 0 | 1 | 0 | 0 | 0 |
| 3 | FGH | | | 2 | 2 | 32 | 0 | 1 | 0 | 0 | 0 |
| 4 | DE | | | 2 | 1 | 128 | 0 | 0 | 0 | 0 | 1 |
| ... | ... | | | ... | ... | ... | ... | ... | | | |
| 20 | ABC | | | 100 | 1 | 128 | 1 | 0 | 0 | 0 | 0 |
| .. | .. | | | .. | .. | .. | | .. | | | |
| 30 | ABC | | | 200 | 1 | 256 | 1 | 1 | 0 | 0 | 0 |
| 31 | ABC | | | | | | 0 | 0 | 0 | 0 | 0 |
| 32 | IJK | | | | | | 0 | 0 | 1 | 1 | 0 |
| .. | .. | | | .. | .. | .. | .. | .. | .. | .. | .. |

METHOD FOR CHANGING A FILE NAME OF A DIRECTORY IN A NON-REWRITABLE RECORD MEDIUM

BACKGROUND OF THE INVENTION

1. Field of the Invention

The present invention relates to a method for changing a file name of a directory in a record medium having a plurality of data and a directory including file names of the data recorded thereon.

2. Related Background Art

A floppy disk or magnetic hard disk which magnetically records and reproduces data, and a card-like optical information record medium (optical card) or disk-like optical information record medium (optical disk) which records and reproduces data by using a light beam have been known as information record media. Auxiliary data or a so-called directory which manages data block by block to store a large volume of data is used in such an information record medium. Usually, file information such as file mames, file lengths and start data track numbers are recorded in the directory to manage the files of the data.

The optical card, particularly a non-erasable write-after type optical card has a size as small as a credit card but has a large record capacity. In order to manage such a large volume of information, the management of information by a directory is required.

FIG. 1 shows a plan view of an example of an optical card. The optical card 1 has a data record area 10 and a directory record area 20. A plurality of data are recorded on data tracks $10_1$, $10_2$, ..., $10_n$ of the data record area 10. On the other hand, a plurality of directories for managing the data are recorded in sectors $20_1$, $20_2$, $20_3$, ..., $20_n$ of the directory record area 20.

The data is sequentially recorded in an unrecorded area of the data record area 10 to follow the recorded data along a direction E. On the other hand, the directories are sequentially recorded in an unrecorded area of the directory record area 20 to follow the recorded directory along a direction D. A series of data are handled as a file and a directory is imparted to each file. The directory usually includes a file name of the data and address information such as a start track number.

When such a large volume of data is to be managed by files, it is desirable to erase unnecessary files in order to facilitate the retrieval of a desired file. However, in the write-after type record medium such as a conventional optical card, it is not possible to physically erase the recorded data.

A method for logically erasing unnecessary data by using the directory is provided in U.S. Pat. No. 4,910,724. This method is explained with reference to FIG. 2.

In FIG. 2, numerals 21 to 25 denote directory areas and numerals 21a to 24a denote data areas. Directory information of files 1 to 4 of the data areas 21a to 24a are recorded in directories 1 to 4 of the directory areas 21 to 24. Assuming now that the file 3 is no longer needed, an erasure directory 3 which indicates that the file 3 is not necessary is written into the directory area 25. In the erasure directory 3, the information which indicates that the directory is the erasure directory and the information which identifies the directory of the file to be erased are recorded. In the present example, the information of the directory 3 is recorded as the directory of the file to be erased. In this manner, the file 3 is logically erased.

When data is to be reproduced from the optical card, the data in the directory areas 21 to 25 is reproduced by an information recording/reproducing apparatus, and all or a necessary portion of the directory information of the directory areas, that is, the directory information of the directory areas 21 to 25 in the present example, are written into a memory in a host computer connected to the information recording/reproducing apparatus or an auxiliary memory. Then, the host computer erases the directory 3 indicated by the erasure directory 3 from the read-in directory information and writes the directories 1, 2 and 4. The files are managed by the directories 1, 2 and 4.

In the above method, the erasure directory for the file which cannot be actually erased is provided in the directory area so that the file is treated as if it were erased. By the use of the erasure directory, the updating of data of any file and the file name is attained. When the data is to be updated, the erasure directory is recorded, and the updated data and a directory which has the same file name and the address information of the updated data are recorded. In order to change the file name, the erasure directory is recorded and a new directory which has a new file name and the same address information such as the start data track number is recorded. This may also be applicable to the change of an attribution of the file.

On the other hand, Japanese Patent Application Laid-open No. 1-258288 discloses a method for appending data to a desired file. In this method, a flag (append flag) which indicates the addition of the file data is provided in the directory information. When the data is to be added to the file, the data to be added is recorded as a separate file. A directory which manages the additional data file (partial file) is recorded in the directory record area by incrementing the append flag. In this manner, the files which have the same file name and the different append flags are treated as one file having the data recorded in the order of the append flags.

When a file name of the file having the plurality of partial files is to be changed, the erasure directory is first recorded, and as many directories including the new file name as the number of the partial files are recorded.

Because the optical card is of the same size as the credit card and hence easy to carry, the application of the optical card to the addition of data such as recording of daily blood pressure measurement is highly expected. When the file name in the optical card applied to such addition of data is to be changed in the manner described above, it may be required to record several tens to several hundreds of directories. Thus, a long time is required to change the file name and the record capacity for the data is reduced because many directories are recorded.

SUMMARY OF THE INVENTION

It is an object of the present invention to provide a method for changing a file name of a directory with a small amount of additional recording and in a short time.

The above object of the present invention is achieved by a method for changing a file name of one of data on a record medium having a plurality of data and a plurality of directories for the data including file names of the data recorded thereon, comprising the steps of:

recording on the record medium a first change directory including the file name of said one data and information indicating that said change directory is a directory for changing the file name; and recording on the record medium a second change directory including a new file name to be imparted to said one data.

According to one aspect of the present invention, there is provided a method for recording information on a record medium having a first area for recording data and a second area for recording a directory to be used to manage the data, comprising the steps of:

recording data in the first area of the medium;

recording a directory including a file name of the data in the second area of the medium;

recording in the second area of the record medium a first change directory including a file name prior to the change of data and information for indiating that the first change directory is a directory for changing the file name; and recording in the second area of the record medium a second change directory including a new file name to be imparted to said one data and information indicating that the second change directory is a directory indicating the new file name.

According to another aspect of the present invention, there is provided a record medium comprising:

a first area having a plurality of data recorded therein; and a second area having a plurality of directories for managing the data recorded therein;

each of said directories having a plurality of ordinary directories one for each of the data, each ordinary directory including a file name for the corresponding data and address information, and a first change directory having file names prior to the change of data recorded therein and a second change directory having file names after the change of data recorded therein.

According to a further aspect of the present invention, there is provided a method for retrieving data by an apparatus having means for reading data and a directory from the record medium and a memory for storing the read directory, comprising the steps of:

reading the ordinary directories, the first change directory and second change directory from the medium; storing the read ordinary directories in a memory;

identifying the ordinary directory stored in the memory having the same file name as the file name stored in the first change directory;

substituting the file name of the identified ordinary directory with the file name recorded in the second change directory in the memory; and retrieving the data recorded on the medium by using the ordinary directories including the directory having the file name substituted, stored in the memory.

BRIEF DESCRIPTION OF THE DRAWINGS

FIGS. 4A, 4B and 5A to 5C illustrate a method of the present invention for changing a file name;

FIGS. 7 and 8 show examples of the directory recorded by the method of the present invention.

DETAILED DESCRIPTION OF THE PREFERRED EMBODIMENTS

Figure 1:
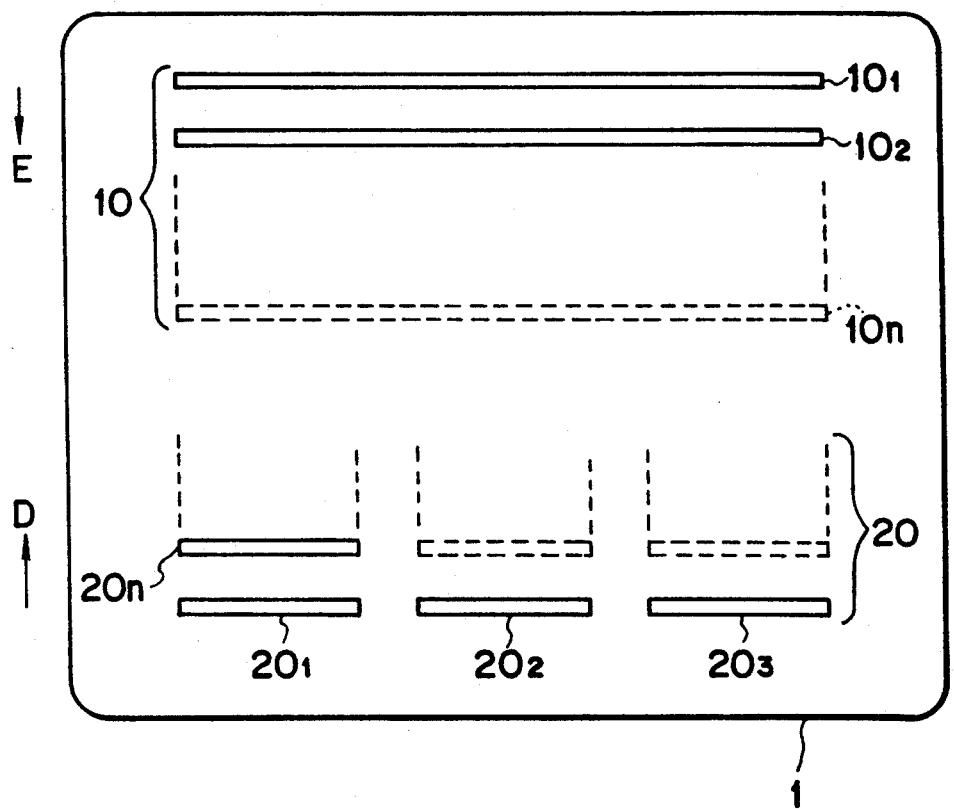
FIG. 1 shows a plan view of an optical card which may be used in the present invention.
Figure 2:
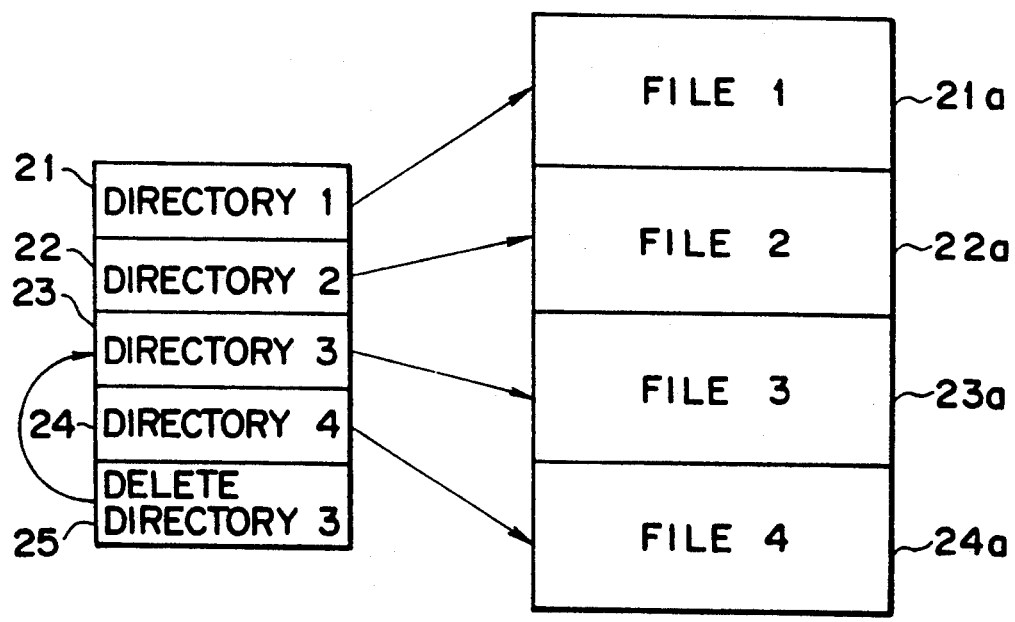
FIG. 2 shows a diagram for explaining a prior art method for logically erasing a directory.
Figure 3:
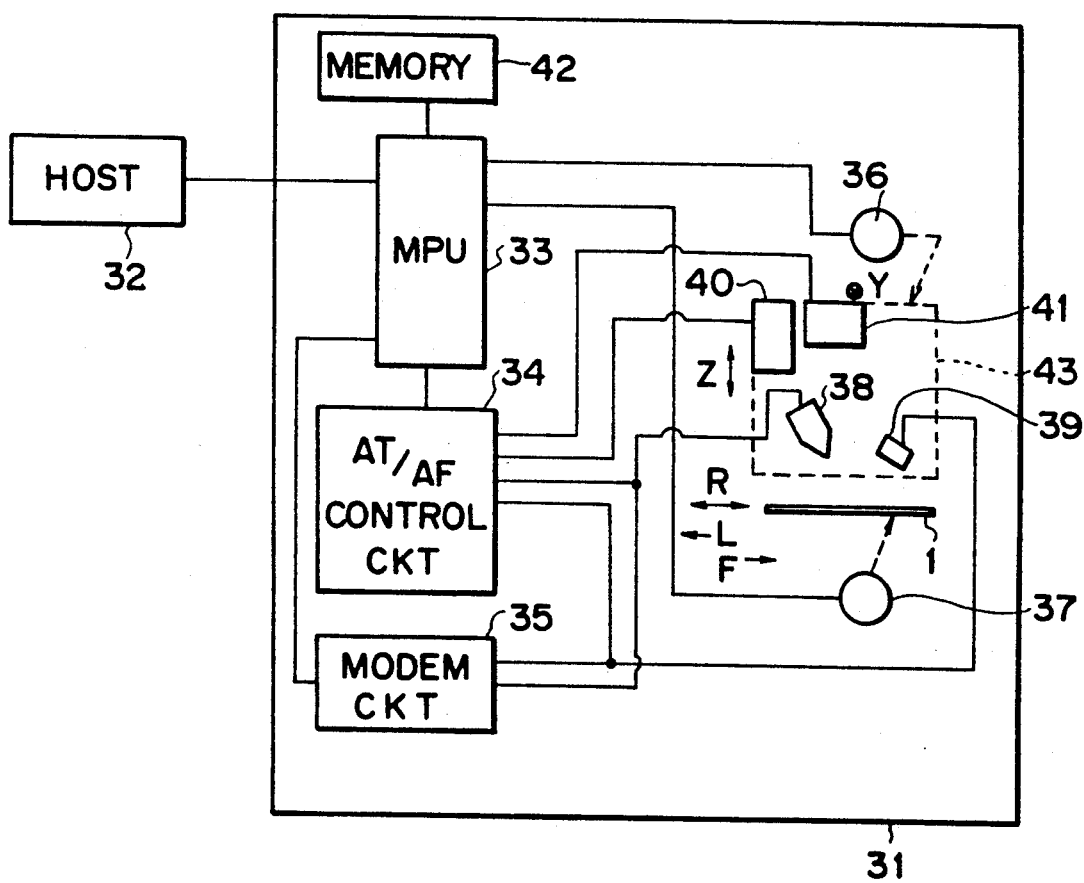
FIG. 3 shows a block diagram of an optical card recording/reproducing apparatus used in the present invention.

FIG. 3 shows a block diagram of an information recording/reproducing apparatus for implementing the method of the present invention. This apparatus records and reproduces information on or from the optical card 1 shown in FIG. 1.

In FIG. 3, a drive 31 is connected to a host computer 32 so that data and recording/reproducing command signals are exchanged therebetween. The recording/reproduction on and from the optical card 1 is effected by an optical head 43. A light source 38 including a laser diode for irradiating a light beam to the optical card 1, and a photo-detector 39 for detecting the light beam reflected by the optical card 1 are provided in the optical head 43. The light beam emitted from the light source 38 is focused onto the optical card by an objective lens (not shown). The objective lens is driven by an auto-focusing (AF) actuator 40 and an auto-tracking (AT) actuator 41 which are built in the optical head 43, along the direction of an optical axis of the light beam and perpendicularly to the optical axis, respectively.

An AT/AF control circuit 34 detects a focusing error signal and a tracking error signal from the output of the photo-detector 39 in a known method. The AT/AF control circuit 34 drives the AF actuator 40 and the AT actuator 41 in accordance with those error signals to conduct AF servo and AT servo. The optical card 1 is reciprocally moved by a card feed motor 37 in directions L and F which are parallel to the longitudinal direction of the track shown in FIG. 1. The optical head 43 is moved across the tracks in a direction Y by a head drive motor 36.

A microprocessing unit (MPU) 33 supplies information sent from the host 32 to a modem 35 when the information is recorded. The modem 35 modulates the light beam emitted from the light source 38 by a signal representing the input information. The tracks of the optical card 1 which is reciprocally moved by the card feed motor 37 is scanned by the modulated light beam so that the information is recorded. When the information is to be reproduced, the light source 38 emits a light beam at a predetermined intensity and the track having the information recorded thereon is scanned by the light beam. The reflected light which has been modulated by the recorded information is detected by the photo-detector 39. The output of the photo-detector 39 is sent to the modem 35 so that the signal is demodulated. The demodulated signal is sent to the host 32 through the MPU 33.

The directory information recorded in the directory record area of the optical card 1 is written into a memory 42. The MPU 33 controls the head drive motor 36 in accordance with the directory information written in the memory 42 to cause the optical head 43 to access a desired track.

The process of recording/reproduction by using the above apparatus is now explained.

When a file is to be recorded, the MPU 33 causes the optical head 43 to access the unrecorded area of the data record area 10 of the optical card 1 in accordance with a record command from the host 32. Then, it sends the data sent from the host 32 to the modem 35 to cause the light source 38 to emit the modulated light beam. The optical card 1 is reciprocally moved by the card feed motor 37 and the track is scanned by the modulated light beam to record a series of data (file).

The MPU 33 then causes the optical head 43 to access the unrecorded area of the directory record area 20 of the optical card. The optical card is scanned by the modulated light beam as it is done in recording the data so that the directory corresponding to the file recorded in the data record area is written into the directory record area. The directory thus written includes the file name of the input file from the host 32 and address information indicating a position in the data record area 10 at which the file is recorded.

For each recording of the file, the above steps are repeated so that a plurality of files and a plurality of corresponding directories are recorded on the optical card 1.

When the file thus recorded is to be retrieved and the data is to be reproduced, the MPU 33 causes the optical head 43 to access the directory record area 20 of the optical card 1. All directories recorded in the area are read by the optical head 43 and they are stored in the memory 42. The file names of the directories stored in the memory 42 are sent to the host 32 through the MPU 33 and a list of the file names is displayed on a display (not shown) of the host 32. The user instructs the repoduction of a desired file by a keyboard (not shown) in accordance with the displayed file names.

When the reproduction is instructed by the host 32, the MPU 33 reads the address information of the designated file from the directories stored in the memory 42. Then, it causes the optical head 43 to access the position in the data storage area which is designated by the address information read from the memory 42. The optical head 43 reads the recorded data by the reproduction operation described above and sends the data to the host 32 through the modem 35 and the MPU 33.

A method of the present invention for changing the file name by using the above apparatus is now explained with reference to FIGS. 4A and 4B, which show the information recorded on the medium. The contents of the information are shown in the frames.

Figure 4A:
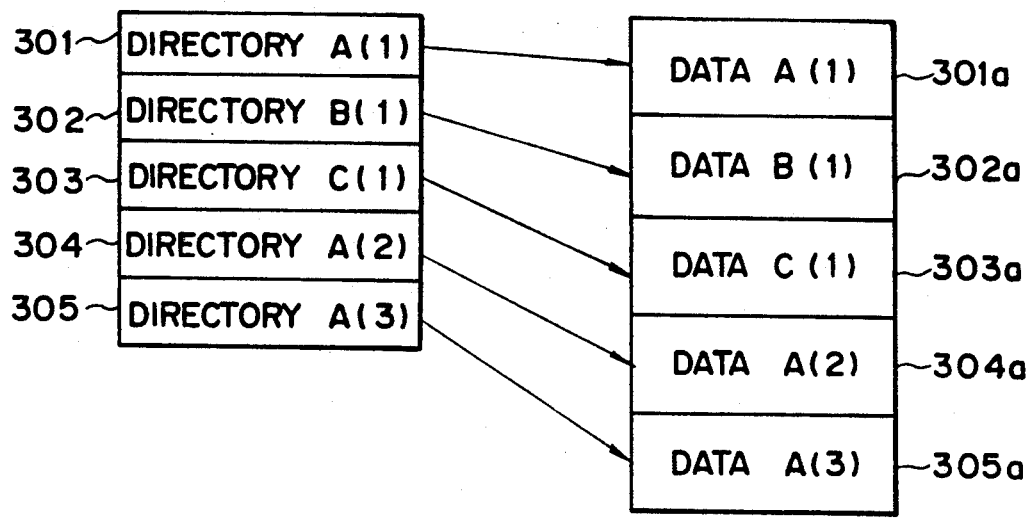

FIG. 4A shows a state prior to the change of the file name. Numerals 301 to 305 denote directory areas, numerals 301a to 305a denote data areas, A, B and C denote file names, and numerals in parentheses indicate append flags. In the present example, the file A originally included data A(1), and data A(2) and data A(3) were additionally recorded. As a result, the data of the file A is dividedly recorded by data areas 301a, 304a and 305a. No data was added to the files B and C.

Figure 4B:
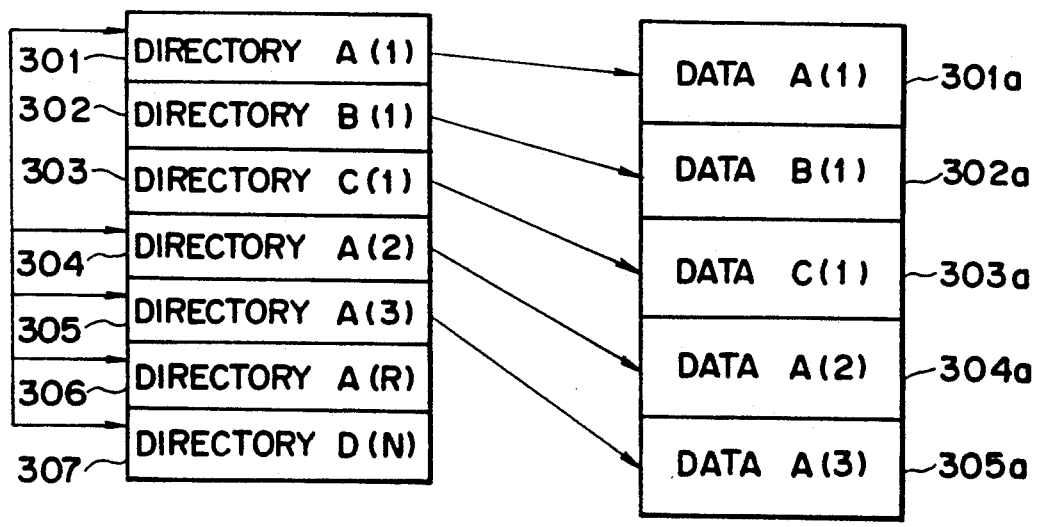

When the file name A is to be changed, a directory which indicates the change of the file name is recorded in the directory area 306 as shown in FIG. 4B. A new file name is recorded in the directory area 307. Information (R) which indicates that the directory is one which indicates the change of the file name and the file name A to be changed are recorded as the directory which indicates the change of the file name. Information (N) which indicates that the directory is one which indicates the new or updated file name, and the updated file name D are recorded as the directory which indicates the new file name. By recording the directory which indicates the change of the file name, the file name of the target file can be changed to the desired file name.

An operation to reproduce the information from the optical card having the directory which indicates the change of the file name recorded thereon is now explained.

FIG. 5A shows directory information recorded on the optical card. It is identical to the record content of the directory of FIG. 4B. When the optical card is loaded to the information recording/reproducing apparatus of FIG. 3, the directory information of the directory areas 301 to 307 is first reproduced by the optical head 43. All or a necessary portion of the directory information in the directory areas (the directory areas 301-305 in the present example) are written into the memory 42 connected to the MPU 33. FIG. 5B shows a state in which the directory information of the directory areas 301-305 has been written into the memory 42.

When the information of the directory areas has been written, the host computer 32 recognizes by the information of the directory areas 306 and 307 that the file name A has been changed to the file name D. Thus, the host computer 32 changes the file name of the directory information of the directory areas 301, 304 and 305 stored in the memory 42 to the file name D as shown in FIG. 5C. Accordingly, all corresponding file names are changed to the desired file name and the host computer 32 thereafter manages the files by the directory information shown in FIG. 5C.

Figure 6:
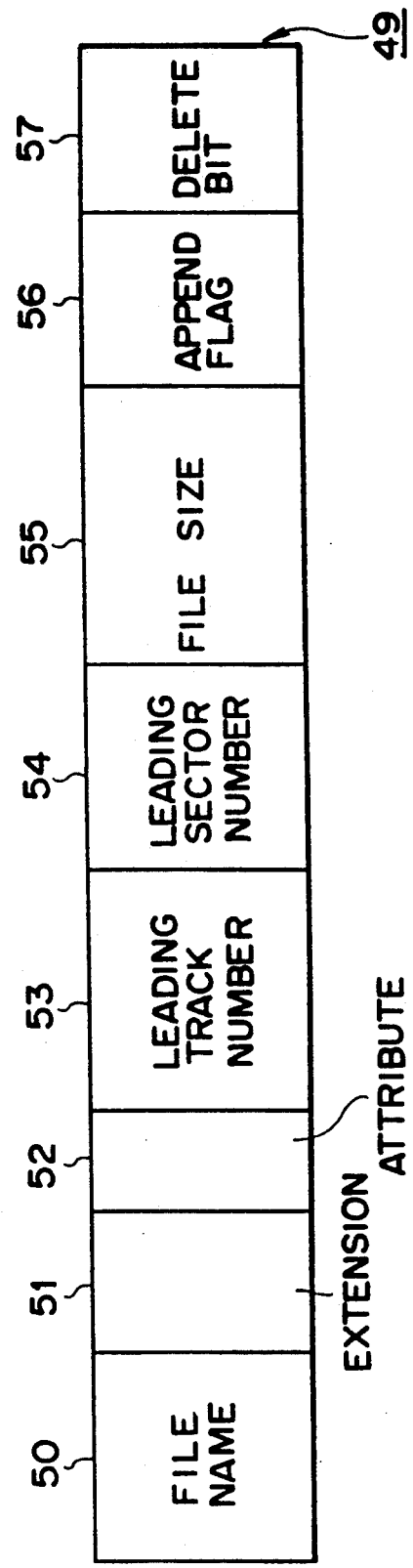
FIG. 6 shows one embodiment of a format of a directory of a medium used in the present invention.

FIG. 6 shows an example of a format of the directory used in the present invention. The directory 49 comprises a file name field 50, an expansion field 51, an attribute field 52, a leading track number field 53, a leading sector number field 54, a file size field 55, an append flag 56 and a delete bit 57. Each field comprises code data having one or more bits.

The append flag 56 indicates the directory which corresponds to the added partial file, as described in the above-noted Japanese Patent Application Laid-open No. 1-258288. In the present invention, the information (R) which indicates the directory for the change of the file name and the information (N) which indicates the directory which indicates the new file name are recorded in the append flag 56. The delete bit 57 includes the information which indicates the erasure directory as described in the above-noted U.S. Pat. No. 4,910,724. For example, the directory having a "0" delete bit indicates a normal directory or a change directory, and the directory with "1" delete bit indicates the erasure directory.

FIG. 7 shows a directory recorded in the directory record area of the medium by using the format of FIG. 6. In the present example, a plurality of parallel tracks are formed on the optical card and two sectors each having 128-byte data are recorded on each track.

In FIG. 7, the directory No. 1 indicates that data having a file name "ABC" is recorded in the first and second sectors of a track No. 1. Similarly, a directory No. 2 indicates that data with a file name "DE" is recorded in the first sector of a track No. 2. A directory No. 3 indicates that 32-byte data with a file name "FGH" is recorded in the second sector of the track No. 2.

A directory No. 4 indicates that the data of the file name "DE" is logically erased. This is determined by the fact that the delete bit (DB) of the directory No. 4 is "1". A directory No. 20 indicates that data of the first sector of a track No. 100 has been added to the data of the file name "ABC". This is determined by the fact that the append flag of the directory No. 20 is "2". Similarly, a directory No. 30 indicates that data recorded in the first and second sectors of a track No. 200 has been added to the data of the file name "ABC". This is determined by the fact that the appended flag of the directory No. 30 is "3".

A directory No. 31 indicates that the file name "ABC" is to be changed. This is determined by the the fact that the append flag is R. A directory No. 32 indicates that a new file name is "IJK". This is determined by the fact that the append flag is N.

Table 1 shows information stored in the memory 42 when the directories recorded as shown in FIG. 7 are read by the apparatus of FIG. 3.

TABLE 1

| File Name | Leading Track No. | Leading Sector No. | File Size |
|---|---|---|---|
| IJK | 1 | 1 | 256 |
|  | 100 | 1 | 128 |
|  | 200 | 1 | 256 |
| FGH | 2 | 2 | 32 |

In Table 1, the file name "IJK" is the updated version of "ABC". Accordingly, the leading track number, the leading sector number and the file size are identical to those recorded in the directories No. 1, No. 20 and No. 30 of FIG. 7. The file name "DE" has been deleted from the memory 42 because of the presence of the directory No. 4.

FIG. 8 shows a specific example of the append flag of FIG. 7. FIG. 8 is identical to FIG. 7 except for the append flag, and the detailed explanation thereof is omitted. In the present example, the append flag (AF) comprises 2-bit append bits (AB) and 2-bit change bits (CB). The append flags "1", "2" and "3" of the directories No. 1, No. 20 and No. 30 of FIG. 7 are represented by "01", "10" and "11" in AB of FIG. 8. Append flags "R" and "N" of the directories No. 31 and No. 32 of FIG. 7 are represented by "01" and "10" in CB of FIG. 8.

Various modifications of the embodiments of the present invention may be made. For example, in the embodiment, the information which indicates the change directory is a portion of the append flag, although the information may be independent from the append flag. In the embodiment, the information (N) which indicates the directory which includes the new file name is recorded in the append flag, although the information (N) is not always necessary and the information (N) may not be recorded if it is ruled that the directory which is recorded following the directory which includes the file name to be changed includes a new file name. Further, while an optical card is used in the embodiment, the present invention is also applicable to an optical disk or other non-rewritable medium.

The present invention covers all of the above modifications without departing from the scope of the following claims.

What is claimed is:

1. A method for changing a file name of one of data on a record medium having a plurality of data and a plurality of directories for the data including file names of the data recorded thereon, said method comprising the steps of:
   recording on the record medium a first change directory including the file name of said one data and information indicating that said change directory is a directory for changing the file name; and
   recording on the record medium a second change directory including a new file name to be imparted to said one data.

2. A method for changing a file name according to claim 1, wherein said second change directory includes information indicating that said second change directory is a directory including the new file name to be imparted to said one data.

3. A method for changing a file name according to claim 1, wherein said information indicating the change directory includes coded information of one or more bits.

4. A method for changing a file name according to claim 1, wherein the medium has a first area having data recorded therein and a second area having directories recorded therein, and said first and second change directories are appendedly recorded in an unrecorded area of the second area.

5. A method for changing a file name according to claim 4, wherein a plurality of parallel tracks are provided in the medium, the data are recorded from one end track of the tracks and the directories are recorded from the other end track.

6. A method for changing a file name of one of data on a non-rewritable record medium having a first area having a plurality of data recorded therein and a second area having a plurality of directories for the data including file names of the data recorded therein, said method comprising the steps of:
   additionally recording a first change directory including a file name of said one data and information indicating that said first change directory is a directory for changing the file name, in an unrecorded area of the second area of the record medium; and
   additionally recording a second change directory including a new file name to be imparted to said one data in an unrecorded area of the second area of the record medium.

7. A method for changing a file name according to claim 6, wherein said second change directory includes information indicating that said second change directory is a directory including the new file name to be imparted to said one data.

8. A method for changing a file name according to claim 6, wherein said information indicating the change directory includes coded information of one or more bits.

9. A method for changing a file name according to claim 6, wherein a plurality of parallel tracks are provided in the medium, the data are recorded from one end track of the tracks and the directories are recorded from the other end track.

10. A method for recording information on a record medium having a first area for recording data and a second area for recording a directory to be used to manage the data, said method comprising the steps of:
    recording data in the first area of the medium;
    recording a directory including a file name of the data in the second area of the medium;
    recording in the second area of the record medium a first change directory including a file name prior to the change of data and information for indicating that the first change directory is a directory for changing the file name; and
    recording in the second area of the record medium a second change directory including a new file name to be imparted to said one data and information indicating that the second change directory is a directory indicating the new file name.

11. A method for changing a file name according to claim 10, wherein said second change directory includes information indicating that said second change directory is a directory including the new file name to be imparted to said one data.

12. A method for changing a file name according to claim 10, wherein said information indicating the change directory includes coded information of one or more bits.

13. A method for changing a file name according to claim 10, wherein a plurality of parallel tracks are provided in the medium, the data are recorded from one end track of the tracks and the directories are recorded from the other end track.

14. A record medium comprising:
a first area having a plurality of data recorded therein; and
a second area having a plurality of directories for managing the data recorded therein;
each of said directories having a plurality of ordinary directories one for each of the data, each ordinary directory including a file name for the corresponding data and address information, and a first change directory having file names prior to the change of data recorded therein and a second change directory having file names after the change of data recorded therein.

15. A record medium according to claim 14, wherein said first change directory includes information for discriminating from the ordinary directory and the second change directory.

16. A record medium according to claim 15, wherein said information comprises coded information having one or more bit.

17. A record medium according to claim 14, wherein said second change directory includes information for discriminating from the ordinary directory and the first change directory.

18. A record medium according to claim 17, wherein said information comprises coded information having one or more bits.

19. A record medium according to claim 14, wherein said address information comprises a leading track number and a leading sector number.

20. A record medium according to claim 14, wherein said directories further include an erasure directory for erasing the file, and the erasure directory includes a delete bit for discriminating from the ordinary directory and the first and second directories.

21. A record medium according to claim 14, wherein said record medium is a card-like optical information record medium having a plurality of parallel tracks formed thereon.

22. A method for retrieving data by an apparatus that includes means for reading data and a directory from a record medium and a memory for storing the read directory, the record medium including a plurality of data, a plurality of ordinary directories for the data including file names of corresponding data and address information, a first change directory having file names prior to a change of data recorded therein, and a second change directory having file names after a change of data recorded therein, said method comprising the steps of:
reading the ordinary directories, the first change directory and the second change directory from the medium;
storing the read ordinary directories in a memory;
identifying an ordinary directory stored in the memory having the same file name as the file name recorded in the first change directory;
substituting the file name of the identified ordinary directory with the file name recorded in the second change directory in the memory; and
retrieving the data recorded on the medium by using the ordinary directories including the directory having the file name substituted, which was stored in the memory.

23. A method for retrieving data according to claim 22, wherein the medium further includes an erasure directory having a file name to be erased recorded therein, and said method further comprises erasing the ordinary directory stored in the memory, which has the same file name as that in the erasure directory.

* * * * *